(12) United States Patent
Shimoda et al.

(10) Patent No.: US 12,546,369 B2
(45) Date of Patent: Feb. 10, 2026

(54) PROPELLER SHAFT AND BOOT PROTECTION MEMBER OF PROPELLER SHAFT

(71) Applicant: HITACHI ASTEMO, LTD., Hitachinaka (JP)

(72) Inventors: Tatsuya Shimoda, Hitachinaka (JP); Byung Goo Park, Monroe, GA (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 332 days.

(21) Appl. No.: 18/320,754

(22) Filed: May 19, 2023

(65) Prior Publication Data

US 2024/0384762 A1  Nov. 21, 2024

(51) Int. Cl.
*F16D 3/84* (2006.01)
*F16D 3/22* (2006.01)

(52) U.S. Cl.
CPC .......... *F16D 3/845* (2013.01); *F16D 3/22* (2013.01); *F16D 2300/0212* (2013.01); *Y10S 464/906* (2013.01)

(58) Field of Classification Search
CPC .... F16D 3/845; F16D 3/22; F16D 2300/0212; Y10S 464/906
USPC .............................. 464/17, 173; 24/537, 545
See application file for complete search history.

(56) References Cited

U.S. PATENT DOCUMENTS

| | | | | |
|---|---|---|---|---|
| 3,370,815 | A | * | 2/1968 | Opperthauser ....... F16L 55/035 |
| 4,471,512 | A | * | 9/1984 | Thalenfeld ............ A47F 5/0869 |
| 7,115,036 | B2 | * | 10/2006 | Masuda .................. F16D 3/227 464/17 |
| 2022/0144081 | A1 | | 5/2022 | Ishikura et al. |

FOREIGN PATENT DOCUMENTS

JP    2020-139600 A    9/2020

* cited by examiner

*Primary Examiner* — Greg Binda
(74) *Attorney, Agent, or Firm* — FOLEY & LARDNER LLP

(57) ABSTRACT

A propeller shaft PS is provided with a boot protection member 5. The boot protection member 5 is detachable to a first rotation member 1. In this configuration, when the angle variation of a constant velocity joint 3 becomes large, an insertion portion 57 of the boot protection member 5 is interposed between a first cover part 41 and a second cover part 42. Consequently, the interference of the first cover part 41 with the second cover part 42 is suppressed, thereby suppressing the damage of the second cover part 42.

12 Claims, 12 Drawing Sheets

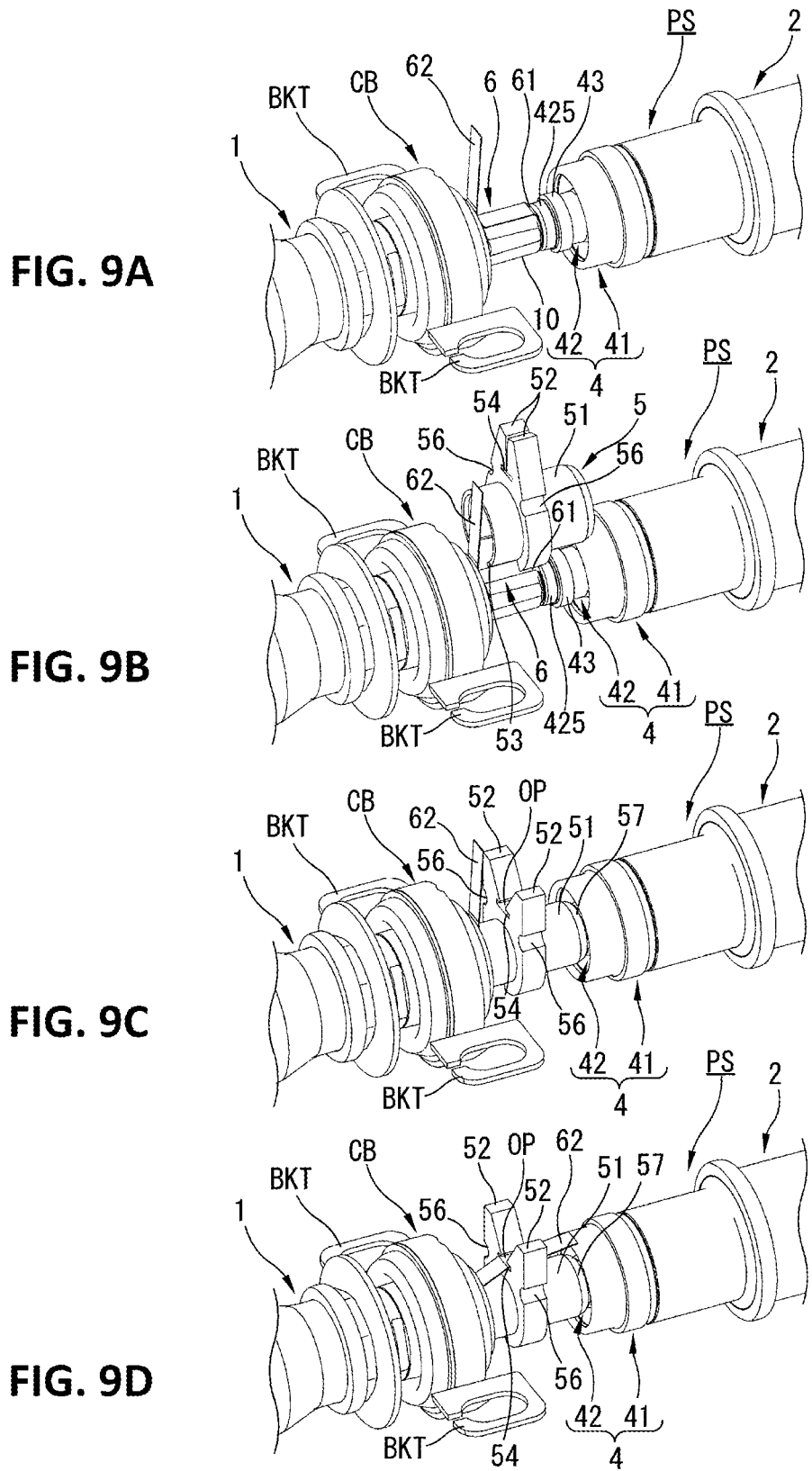

PROPELLER SHAFT AND BOOT PROTECTION MEMBER OF PROPELLER SHAFT

TECHNICAL FIELD

The present invention relates to a propeller shaft and a boot protection member of the propeller shaft.

BACKGROUND OF THE INVENTION

As a conventional propeller shaft, for example, one described in a patent document 1 has been known.

That is, a conventional propeller shaft includes an outer ring member connected to a constant velocity joint, a stub shaft connected to an inner ring member disposed on the inner peripheral side of the outer ring member, and a boot member for sealing between the outer ring member and the stub shaft, and by the boot member, the entering of foreign substances into the inside of the constant velocity joint is suppressed. In addition, the boot member includes a metal first cover part connected to the outer ring member, and a rubber second cover part which extends toward the stub shaft side by being folded back from the first cover part, so as to be connected to the stub shaft.

PRIOR ART

Patent Document

Patent document 1: Japanese Patent Application Publication No. 2020-139600

SUMMARY OF THE INVENTION

Problem to be Solved by the Invention

However, in the conventional propeller shaft, when the propeller shaft is delivered to customers, in case where the angle variation of the constant velocity joint is large, in the boot member, the second cover part interferes with the first cover part, and it causes the damage of the second cover part. There is therefore room for improvement of it.

Therefore, the present invention has been made in consideration of such a technical problem of the conventional propeller shaft, and an object of the present invention is to provide a propeller shaft and a boot protection member of the propeller shaft in which the damage of a boot member can be suppressed.

Means for Solving the Problem

In the present invention, In one aspect thereof, in a propeller shaft in which a first rotation member and a second rotation member are connected to each other via a constant velocity joint, and the constant velocity joint is liquid-tightly protected by a boot member, a boot protection member is provided which is detachable to the first rotation member, and surrounds a part of the boot member so as to protect it.

Effect of the Invention

According to the present invention, the damage of the boot member can be suppressed.

BRIEF DESCRIPTION OF THE DRAWINGS

FIG. 4A is a front view and FIG. 4B is a sectional view taken along a line A-A of FIG. 4A.

FIG. 8A illustrates a state of the spacer member in the middle of the insertion and FIG. 8B illustrates a state of the spacer member after the insertion.

FIGS. 9A-9D are enlarged perspective views of a main part of the propeller shaft which show the process of the mounting of the boot protection member and the spacer member to the propeller shaft in the second embodiment of the present invention, and FIG. 9A illustrates the process of the insertion of a longitudinal first end portion of the spacer member into the space between the boot member and a first rotation member, FIG. 9B illustrates a state immediately before the mounting of the boot protection member to the propeller shaft, FIG. 9C illustrates a state immediately after the mounting of the boot protection member to the propeller shaft, and FIG. 9D illustrates the process of the insertion of a longitudinal second end portion of the spacer member into the boot protection member.

FIG. 10A illustrates a state before the removing of the boot protection member, and FIG. 10B illustrates a state after the removing of the boot protection member.

MODE FOR IMPLEMENTING THE INVENTION

In the following, embodiments of a propeller shaft and a boot protection member of the propeller shaft according to the present invention will be explained in detail based on the drawings. In addition, in each of the embodiments below, similar to conventional ones, as an example, one in which the propeller shaft and the boot protection member of the propeller shaft are applied as a propeller shaft for an automobile will be explained.

(Configuration of Propeller Shaft)

Figure 1:
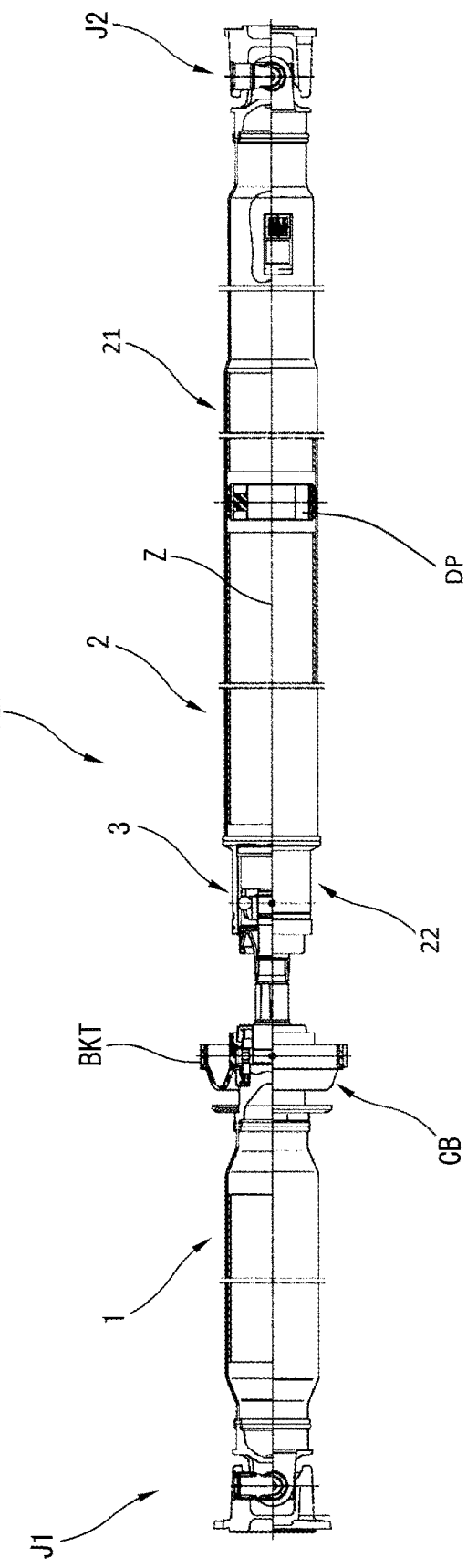
FIG. 1 is a sectional view along the rotation axial line direction of a propeller shaft according to the present invention.

FIG. 1 shows a whole propeller shaft PS according to the present invention, and is a sectional view taken along the rotation axial direction of the propeller shaft PS. In addition, in the following explanation, for convenience, the left side in FIG. 1 is set as a "front", the right side in FIG. 1 is set as a "rear", the direction along a rotation axial line (rotation center) Z in FIG. 1 is set as an "axial direction", the direction orthogonal to the rotation axial line Z is set as a "radial direction", and the direction around the rotation axial line Z is set as a "circumferential direction".

For example, as shown in FIG. 1, the propeller shaft PS according to the present embodiments is provided with a first rotation member 1 connected to a speed change device (transmission) which is not shown in the drawings and is mounted on a vehicle, a second rotation member 2 connected to a differential device (differential gear) which is not shown in the drawings and is mounted on the vehicle, and a constant velocity joint 3 which connects the first rotation member 1 with the second rotation member 2 so as to be relatively movable in the axial direction and integrally rotatable. In addition, the propeller shaft PS is suspended to the vehicle via a bracket BKT provided on the outer peripheral side of a center bearing CB which rotatably supports a shaft portion 10 of the first rotation member 1.

In addition, in the present embodiments, although, as an example, a two-piece propeller shaft PS in which the first rotation member 1 and the second rotation member 2 are connected to each other via the constant velocity joint 3 is shown, a propeller shaft according to the present invention is not limited to the two-piece propeller shaft PS formed by being divided into two pieces. In other words, a propeller shaft according to the present invention may have a configuration in which the first rotation member 1 connected to the speed change device (transmission) which is not shown and the second rotation member 2 connected to the differential device (differential gear) which is not shown are connected to each other, for example, via a plurality of constant velocity joints so as to be divided into three or more pieces.

In addition, the first rotation member 1 is connected to the speed change device (transmission), which is not shown, via a first joint (such as a Cardan joint shown in FIG. 1) J1. On the other hand, the second rotation member 2 is connected to the differential device (differential gear), which is not shown, via a second joint (such as a Cardan joint shown in FIG. 1) J2.

In addition, the first joint J1 and the second joint J2 which connect the propeller shaft PS with the vehicle (the speed change device and the differential device which are not shown) are not limited to the above-mentioned Cardan joints shown in the present embodiments. In other words, the first joint J1 and the second joint J2 may be shaft joints which are capable of connecting the propeller shaft PS and the vehicle (the above-mentioned speed change device and differential device which are not shown), and various changes can be arbitrarily performed in accordance with a mode and the like of the propeller shaft PS. That is, as the first joint J1 and the second joint J2, in addition to universal joints represented by the above-mentioned Cardan joints, for example, flexible shaft joints such as rubber couplings may be applied.
(Configuration of Constant Velocity Joint)

Figure 2:
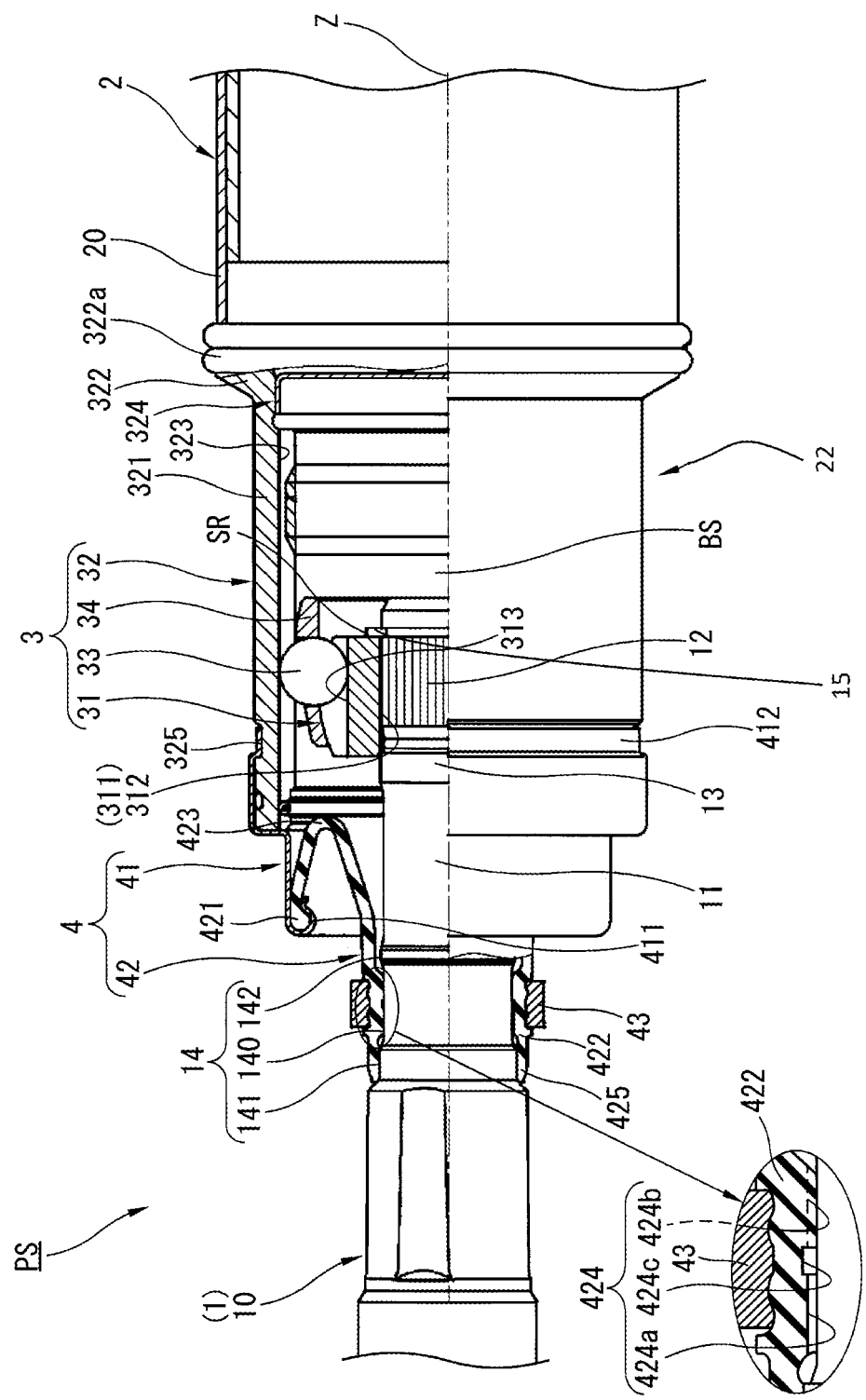
FIG. 2 is an enlarged sectional view of a main part of a propeller shaft according to a first embodiment of the present invention.

FIG. 2 is an enlarged view of a main part of the propeller shaft PS according to the present invention in which the vicinity of the constant velocity joint 3 in the propeller shaft PS is enlarged and shown.

For example, as shown in FIG. 2, the first rotation member 1 includes, on the rear end side thereof, a shaft portion 10 extending toward the second rotation member 2 side along the axial direction. A distal end portion of the shaft portion 10 is provided with a male spline portion 12 with which an inner ring member 31 of the constant velocity joint 3 engages. The male spline portion 12 is formed to have a diameter reduced stepwise from a general part 11 through a step portion 13, on the rear side from the general part 11.

In addition, the shaft portion 10 is provided, more on the front side than the general part 11, with a boot mounting part 14 for the mounting and fixing of a second cover part 42 of the after-mentioned boot member 4. The boot mounting part 14 is formed to have a diameter reduced stepwise with respect to the general part 11, and, in the middle part of the boot mounting part 14, a boot fixing recess portion 140 to which the second cover part 42 of the after-mentioned boot member 4 is fixed is formed to have a diameter reduced stepwise. The boot fixing recess portion 140 is recessed in a step shape between a first enlarged diameter portion 141 having a diameter enlarged stepwise on the front side from the boot fixing recess portion 140 and a second enlarged diameter portion 142 having a diameter enlarged stepwise on the rear side from the boot fixing recess portion 140.

The second rotation member 2 is formed in a cylindrical shape having a cylindrical portion 20 as a main body. A first end portion 21 side of the cylindrical portion 20 is set so as to have a substantially fixed inner diameter in the axial direction, and a second end portion 22 side of the cylindrical portion 20 is formed to have a diameter reduced stepwise with respect to the first end portion 21. In addition, for example, the cylindrical portion 20 is attached, on the inner peripheral side thereof, with a vibration proofing member DP represented by a well-known dynamic damper. With this, the sound vibration of the propeller shaft PS caused by the vibration of the second rotation member 2 can be suppressed.

The constant velocity joint 3 is provided with an inner ring member 31 having a shaft shape and connected to the first rotation member 1, a cylindrical outer ring member 32 disposed on the outer peripheral side of the inner ring member 31, and a plurality of ball members 33 as rolling elements which are rotatably held via an annular cage 34 disposed between the inner ring member 31 and the outer ring member 32. In addition, grease, which is not shown, for lubricating the constant velocity joint 3 is filled in a bearing accommodating space BS formed on the inner side of the outer ring member 32. With this, a cylindrical boot member 4 is provided between the first rotation member 1 and the outer ring member 32 so as to straddle the first rotation member 1 and the outer ring member 32. That is, the connection part between the first rotation member 1 and the outer ring member 32 is covered with the boot member 4, as a result of which the bearing accommodating space BS is maintained in an airtight state, and the lubrication of the constant velocity joint 3 can be excellently kept.

The inner ring member 31 has a cylindrical shape and is formed, on the inner peripheral side thereof, with a shaft insertion hole 311 in a penetrating state, shaft insertion hole 311 through which the first rotation member 1 is inserted. In addition, the shaft insertion hole 311 is formed, on the inner peripheral side thereof, with a female spline portion 312 to which a male spline portion 12 of the first rotation member 1 can be fitted. In addition, the inner ring member 31 is formed, on the outer peripheral side thereof, with a plurality of inner race grooves 313 which linearly extend along the axial direction, and are arranged at equal intervals in the circumferential direction. The inner race grooves 313 are formed to regulate the movement in the circumferential direction of the ball members 33 in cooperation with the after-mentioned outer race grooves 323, while allowing the movement in the axial direction of the ball members 33.

In addition, the male spline portion 12 of the first rotation member 1 includes a circlip fitting groove 15 to which a circlip SR can be fitted, at an axial direction position corresponding to the rear end edge of the inner ring member 31 (end edge on the second rotation member 2 side) in a state in which the inner ring member 31 abuts against the step portion 13. That is, the inner ring member 31 is held between the step portion 13 and the circlip SR, and the rear end edge of the inner ring member 31 engages with the circlip SR, and thereby coming-off of the first rotation member 1 from the inner ring member 31 is suppressed.

The outer ring member 32 includes a cylindrical bearing constituting portion 321 which accommodates the inner ring member 31 on the inner side so as to constitute the constant velocity joint 3, and a connection base portion 322 which is provided at the rear end portion of the bearing constituting portion 321, and is connected to the second rotation member 2 (cylindrical portion 20). The bearing constituting portion 321 and the connection base portion 322 are integrally formed by forging, for example, iron material.

The bearing constituting portion 321 has a cylindrical shape having a substantially fixed inner diameter, and is formed in a cylindrical shape having a bottom in which the front end side of the bearing constituting portion 321 is opened and the rear end side is closed by a sealing plug 324. In addition, the bearing constituting portion 321 is formed, on the inner peripheral side thereof, with a plurality of outer race grooves 323 which linearly extend along the axial direction, and are arranged at equal intervals in the circumferential direction. The outer race grooves 323 are formed to regulate the movement in the circumferential direction of the ball members 33 in cooperation with the inner race grooves 313, while allowing the movement in the axial direction of the ball members 33.

Accordingly, in the bearing constituting portion 321, the ball members 33 roll in the axial direction along the race grooves formed between the inner race grooves 313 and the outer race grooves 323, thereby allowing the relative movement of the inner ring member 31 and the outer ring member 32 in the axial direction. On the other hand, in the bearing constituting portion 321, in the circumferential direction, the ball members 33 engage with the race grooves formed between the inner race grooves 313 and the outer race grooves 323, and the relative movement of the inner ring member 31 and the outer ring member 32 in the circumferential direction, namely relative rotation is restricted, and the inner ring member 31 and the outer ring member 32 are integrally rotated based on driving torque input from the inner ring member 31 side.

The connection base portion 322 is provided so as to project more on the rear end side than the sealing plug 324 along the axial direction at the rear end portion of the bearing constituting portion 321, and is formed in a cylindrical shape in which the rear end side is opened. Specifically, the connection base portion 322 is formed to have a diameter enlarged stepwise with respect to the bearing constituting portion 321, and has an outer diameter similar to that of the second rotation member 2. This connection base portion 322 is connected to the second rotation member 2 by so-called friction welding. In addition, due to the friction welding, a curled portion 322a which is swelled toward the outer and inner sides in the radial direction is annularly formed, by the friction welding, at the connection part of the connection base portion 322 to the second rotation member 2 along the circumferential direction.

The boot member 4 which has a cylindrical shape in which the middle part in the axial direction is folded back includes a metal first cover part 41 which is fixed to the outer peripheral side of the outer ring member 32, and a second cover part 42 which is made of elastic material having flexibility such as rubber material, and is fixed to the boot fixing recess portion 140 of the first rotation member 1 via a boot band 43. The boot member 4 is mounted so as to straddle between the first rotation member 1 and the outer ring member 32, and is formed in a shape in which the second cover part 42 positioned at the middle part in the axial direction is folded back, so as to be expandable in the axial direction.

In the first cover part 41, one end side in the axial direction extends to the direction (front side) approaching the first rotation member 1, and the other end side is fixed to the outer peripheral side of the outer ring member 32 by caulking. Specifically, a first end portion 411 of the first cover part 41 is folded back in a substantially hook shape, and is fixed to one end portion of the second cover part 42 by caulking so as to pinch the one end portion of the second cover part 42. On the other hand, a second end portion 412 of the first cover part 41 is pressed toward the radially inner side in a recessed shape, and is fixed to the outer peripheral side of the outer ring member 32 by caulking so as to come in press-contact with an annular recess portion 325 formed, by being recessed, on the outer peripheral side of the outer ring member 32 along the circumferential direction.

In the second cover part 42, one end side in the axial direction is folded back in a U-shape from the first end portion 411 of the first cover part 41 and is accommodated on the inner peripheral side of the outer ring member 32, and the other end side is fixed to the boot fixing recess portion 140 of the first rotation member 1. Specifically, a first end portion 421 of the second cover part 42 is connected to the first end portion 411 of the first cover part 41, and a second end portion 422 of the second cover part 42 which extends from the first end portion 421 toward the front side along the shaft portion 10 of the first rotation member 1 via a bent portion 423 while being turned in a U-shape is fastened and fixed to the boot fixing recess portion 140 by the boot band 43.

In addition, the second end portion 422 fastened and fixed by the boot band 43 is formed to have a relatively thick thickness, and is formed, on the inner peripheral side thereof which comes in tight contact with the boot fixing recess portion 140, with a ventilation groove 424 for reducing the pressure inside the bearing accommodating space BS by communicating the inside and outside of the boot member 4 tightly sealed by the boot member 4. The ventilation groove 424 includes a pair of axial grooves 424a and 424b, and a circumferential groove 424c connecting the pair of the axial grooves 424a and 424b. The pair of the axial grooves 424a and 424b are formed at circumferential positions different from each other, and each linearly extend along the axial direction. The circumferential groove 424c is provided between the pair of the axial grooves 424a and 424b so as to extend along the circumferential direction, so as to connect the pair of the axial grooves 424a and 424b.

In addition, the second end portion 422 of the boot member 4 is provided with an extending portion 425 which extends toward the front side and comes in contact with the shaft portion 10 of the first rotation member 1 which is adjacent to the boot fixing recess portion 140. The extending portion 425 is formed in a substantially cylindrical shape continuing in the circumferential direction so as to surround the shaft portion 10 of the first rotation member 1 and comes in contact with the shaft portion 10 of the first rotation member 1, thereby suppressing the direct entering of foreign substances, such as moisture and dust, into the ventilation groove 424. At this time, preload for pressing the extending portion 425 to the shaft portion 10 of the first rotation member 1 is not applied to the extending portion 425, and the discharge of the internal pressure of the shaft accommodation space BS through the ventilation groove 424 is secured.

First Embodiment (Configuration of Boot Protection Member)

Figure 3:
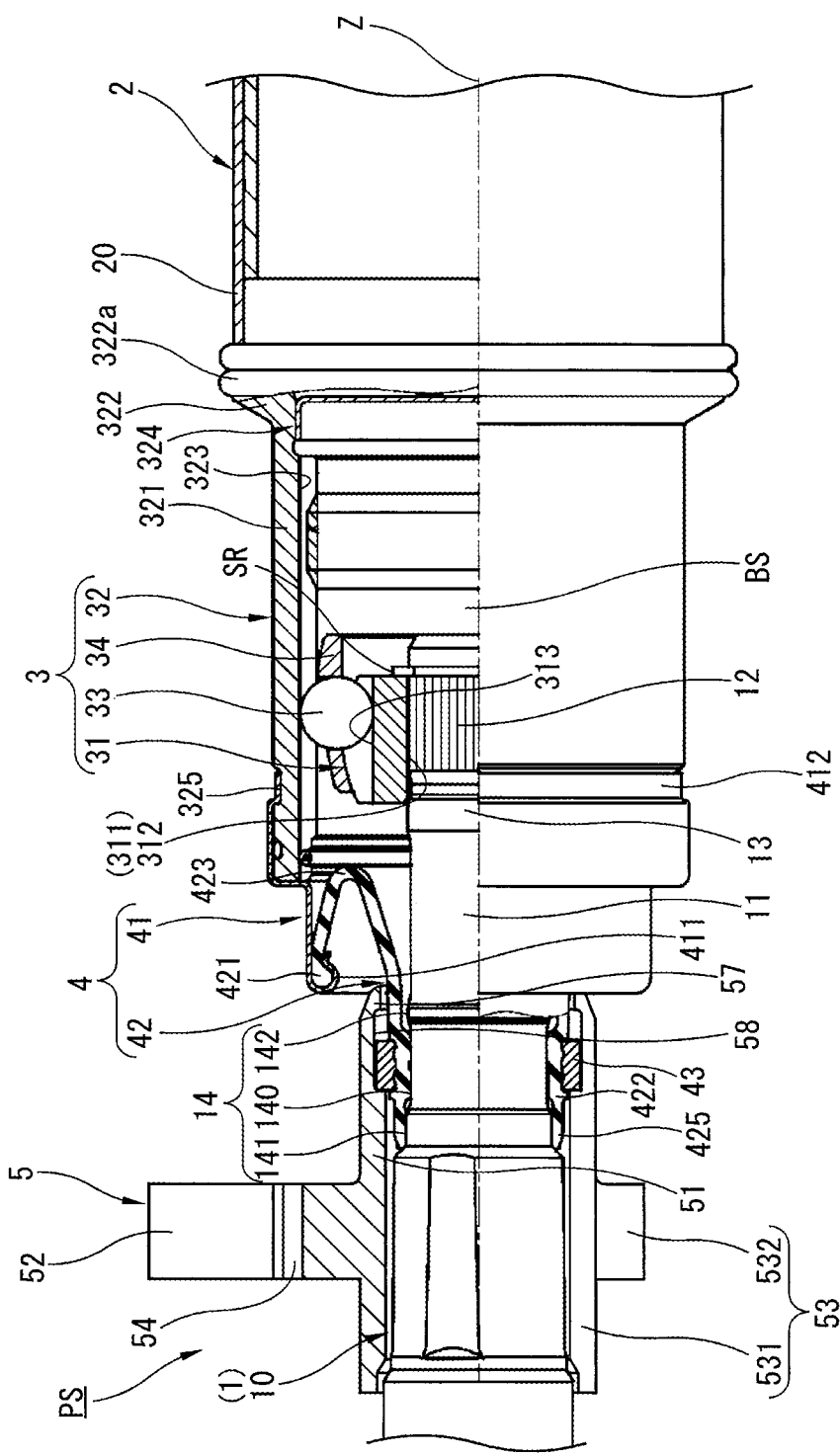
FIG. 3 is an enlarged sectional view of a main part of the propeller shaft according to the first embodiment of the resent invention, and illustrates a state in which a boot protection member is mounted.
Figure 4B:
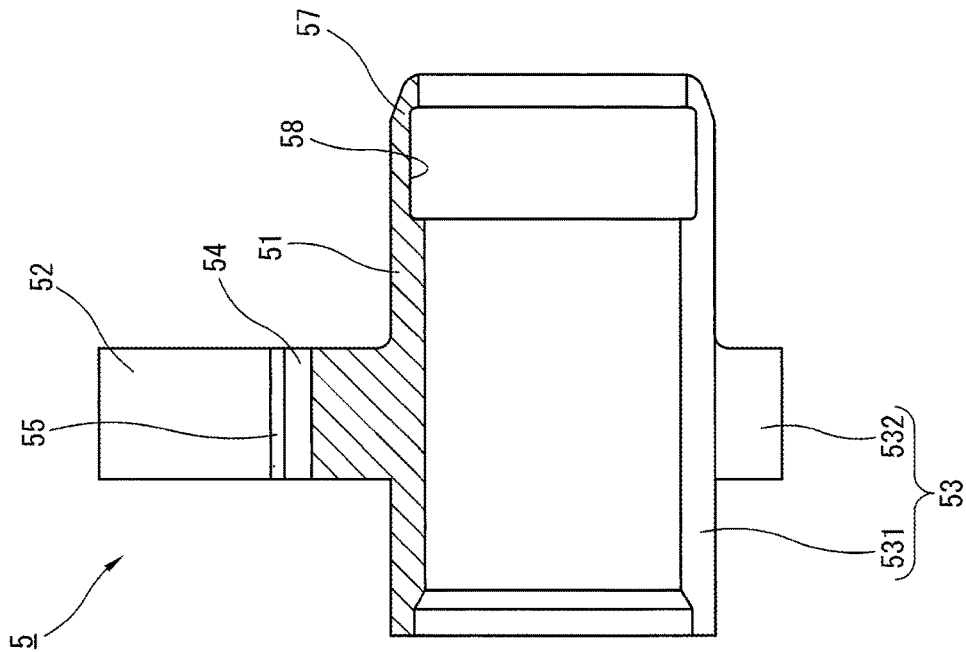
FIGS. 4A and 4B illustrate a boot protection member according to the present invention.
Figure 4A:
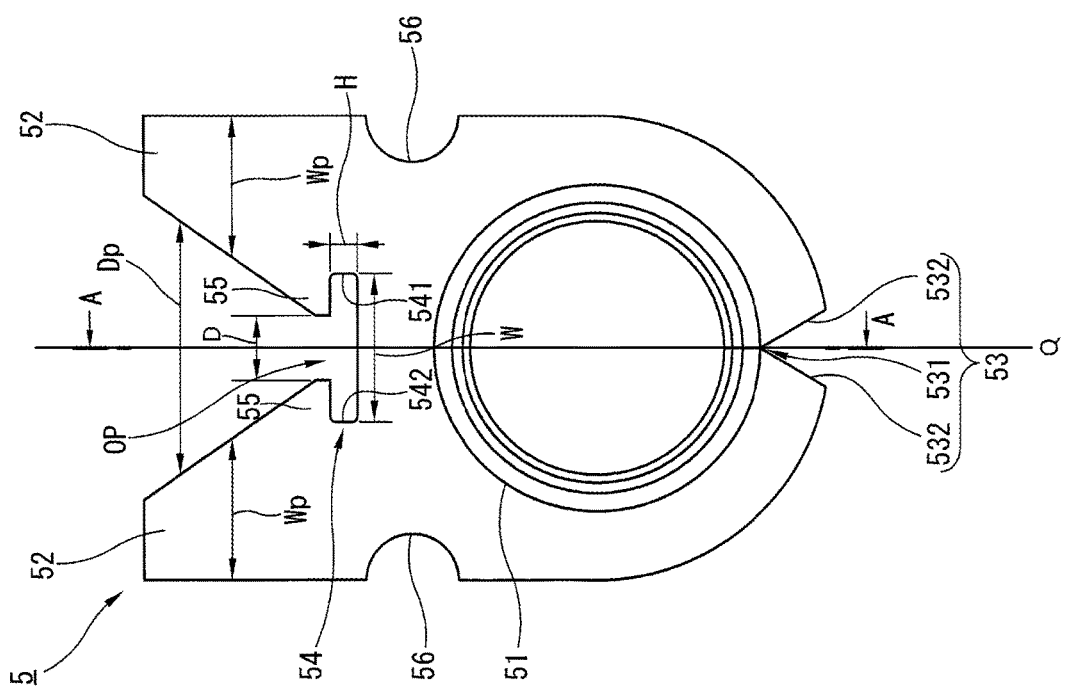

FIG. 3 shows a first embodiment of the boot protection member 5 of a propeller shaft according to the present invention, and is an enlarged sectional view of a main part of the propeller shaft PS shown in FIG. 2 in which the boot protection member 5 according to the present embodiment is mounted. In FIGS. 4A and 4B, there is shown the boot protection member 5 as a single body, and FIG. 4A is a front view and FIG. 4B is a sectional view taken along a line A-A of FIG. 4A.

For example, as shown in FIGS. 3, 4A and 4B, in the boot protection member 5, a cylindrical portion 51 surrounding the outer periphery of the first rotation member 1 and a plurality of projection portions 52 (two projection portions in the present embodiment) provided so as to project toward the outer peripheral side of the cylindrical portion 51 in the radial direction are integrally formed by using material such as resin material and rubber material.

The cylindrical portion 51 has a substantially cylindrical shape, is configured so as to be detachable to the shaft portion 10 of the first rotation member 1, and is mounted so as to straddle the first rotation member 1 and the boot member 4. Specifically, the cylindrical portion 51 is provided with a cut part 53 on the opposite side of a pair of the projection portions 52 with the rotation axial line Z therebetween, along the radial direction, such that when the pair of the projection portions 52 are pinched, the cut part 53 on the opposite side thereof is opened. In addition, a recess portion 58 for avoiding the boot band 43 is formed on the inner peripheral side of the cylinder portion 51 at an axial region close to the rear end portion of the cylindrical portion 51 along the circumferential direction. The recess portion 58 is a rectangular groove recessed in a step shape in the axial cross sectional view, and is set to have an inner diameter slightly larger than the outer diameter of the boot band 43 wound around the boot member 4.

The pair of the projection portions 52 project from the respective both ends of the cylindrical portion 51 along the radial direction, and are provided so as to be substantially symmetrical with each other with a center line Q, which passes through the rotation axial line Z and overlaps with a line A-A of FIG. 4A, therebetween. In addition, as shown in FIG. 4B, it is sufficient to provide the projection portions 52 at a part of an axial region of the cylindrical portion 51, and it is not necessary to provide them over the entire axial region of the cylindrical portion 51. In addition, the pair of the projection portions 52 are formed in so-called taper shapes such that the circumferential width dimension Wp of each of the projection portions 52 gradually increases toward the root portion side and a distance D between the projection portions 52 gradually decreases toward the root portion side.

Moreover, a slit portion 54 penetrating in the axial direction is formed between the root portions of the pair of the projection portions 52, so as to straddle the pair of the projection portions 52. The slit portion 54 has a rectangular shape so as to be substantially symmetrical across the center line Q, and communicates with the outside via an opening portion OP formed between the pair of the projection portions 52. In addition, a circumferential width W of the slit portion 54 is set so as to be larger than a circumferential width D of the opening portion OP, and by this dimensional relationship and the taper shapes of the projection portions 52, a pair of protrusion portions 55 protruding so as to face the inside are formed at the respective root portions of the pair of the projection portions 52 forming the opening portion OP.

In addition, notch portions 56 each recessed in a circular arc shape are formed at the respective outer side portions of the root portions of the pair of the projection portions 52. That is, by the notch portions 56, the rigidity of the root portions of the pair of the projection portions 52 is reduces, such that the pair of the projection portions 52 are easily inclined toward the inside when the pair of the projection portions 52 are pinched from the outside. In other words, the pair of the projection portions 52 can be relatively easily inclined toward the inside, and consequently, the cut part 53 formed on the opposite side of the pair of the projection portions 52 with the rotation axial line Z therebetween can be opened wider.

In addition, an insertion portion 57 inserted between the first cover part 41 and the second cover part 42 is provided at the rear end portion of the cylindrical portion 51. The insertion portion 57 is formed in a taper shape of which the diameter is gradually reduced toward the distal end side without having a shape in which the outer peripheral side is formed to be sharp. With this, the occurrence of the damage of the boot member 4 due to the interference of the insertion portion 57 with the boot member 4 is suppressed. Here, it is not necessary to form the taper shape formed to the insertion portion 57 over the entire axial region of the insertion portion 57, and it may be formed at a part of the axial region of the insertion portion 57. For example, it may be formed at the distal end portion of the insertion portion 57 at which interference with the boot member 4 might occur.

The cut part 53 includes a contact portion 531 which is provided on the inner side in the radial direction, and becomes a contact state in the free state of the boot protection member 5, and a separation portion 532 which is provided more on the outer side in the radial direction than the contact portion 531, and is separated and becomes a non-contact state in the free state of the boot protection member 5. The separation portion 532 is opened radially outward in a V shape, such that the opening width is gradually widened toward the outside in the radial direction so as to be a taper shape. In addition, as shown in FIG. 4B, it is sufficient to provide the separation portion 532 at a part of the axial region of the cylindrical portion 51 on the opposite side of the pair of the projection portions 52 with the rotation axial line Z therebetween, and it is not necessary to provide the separation portion 532 over the entire axial region of the cylindrical portion 51.

Working Effects of Present Embodiment

In the conventional propeller shaft, when the propeller shaft is delivered to customers, in case where the angle variation of the constant velocity joint 3 is relatively large, in the boot member 4, the rubber second cover part 42 interferes with the metal first cover part 41, and it causes the damage of the second cover part 42. There is therefore room for improvement of it.

In contrast to this, according to the propeller shaft PS and the boot protection member 5 of the propeller shaft according to the present embodiment, the following working effects can be obtained, and problems of the conventional propeller shaft can be solved.

The propeller shaft PS according to the present embodiment is a propeller shaft used for automobiles, and is provided with: a first rotation member 1; a second rotation member 2 to which the rotation of the first rotation member 1 is transmitted; a constant velocity joint 3 which is provided between the first rotation member 1 and the second rotation member 2 in the axial direction along a rotation axial line Z of the first rotation member 1, and includes: an inner ring member 31 connected to the first rotation member 1; and an outer ring member 32 which is connected to the second rotation member 2 and to which the rotation is transmitted via a ball member 33 disposed on the outer peripheral side of the inner ring member 31; a boot member 4 which is provided between the first rotation member 1 and the outer ring member 32, and includes: a first cover part 41 having a first end portion 411 extending in a direction approaching the first rotation member 1 in the axial direction and a second end portion 412 fixed to the outer peripheral side of the outer ring member 32; and a second cover part 42 having a first end portion 421 disposed on the inner peripheral side of the outer ring member 32 while being folded back from the first cover part 41 in the axial direction and a second end portion 422 fixed to the first rotation member 1; and a boot protection member 5 which is configured to protect the boot member 4, is detachable to the first rotation member 1, and includes: a cylindrical portion 51 surrounding the outer periphery of the first rotation member 1; an insertion portion 57 which is inserted between the first cover part 41 and the second cover part 42 in the cylindrical portion 51; a plurality of projection portions 52 projecting to the outer peripheral side of the cylindrical portion 51 in the radial direction orthogonal to the rotation axial line Z; a cut part 53 provided on the opposite side of the plurality of the projection portions 52 with the rotation axial line Z therebetween in the cylindrical portion 51; and a slit portion 54 which is provided between the plurality of the projection portions 52 in the circumferential direction of the rotation axial line Z, and penetrates the boot protection member in the axial direction.

Figure 5:
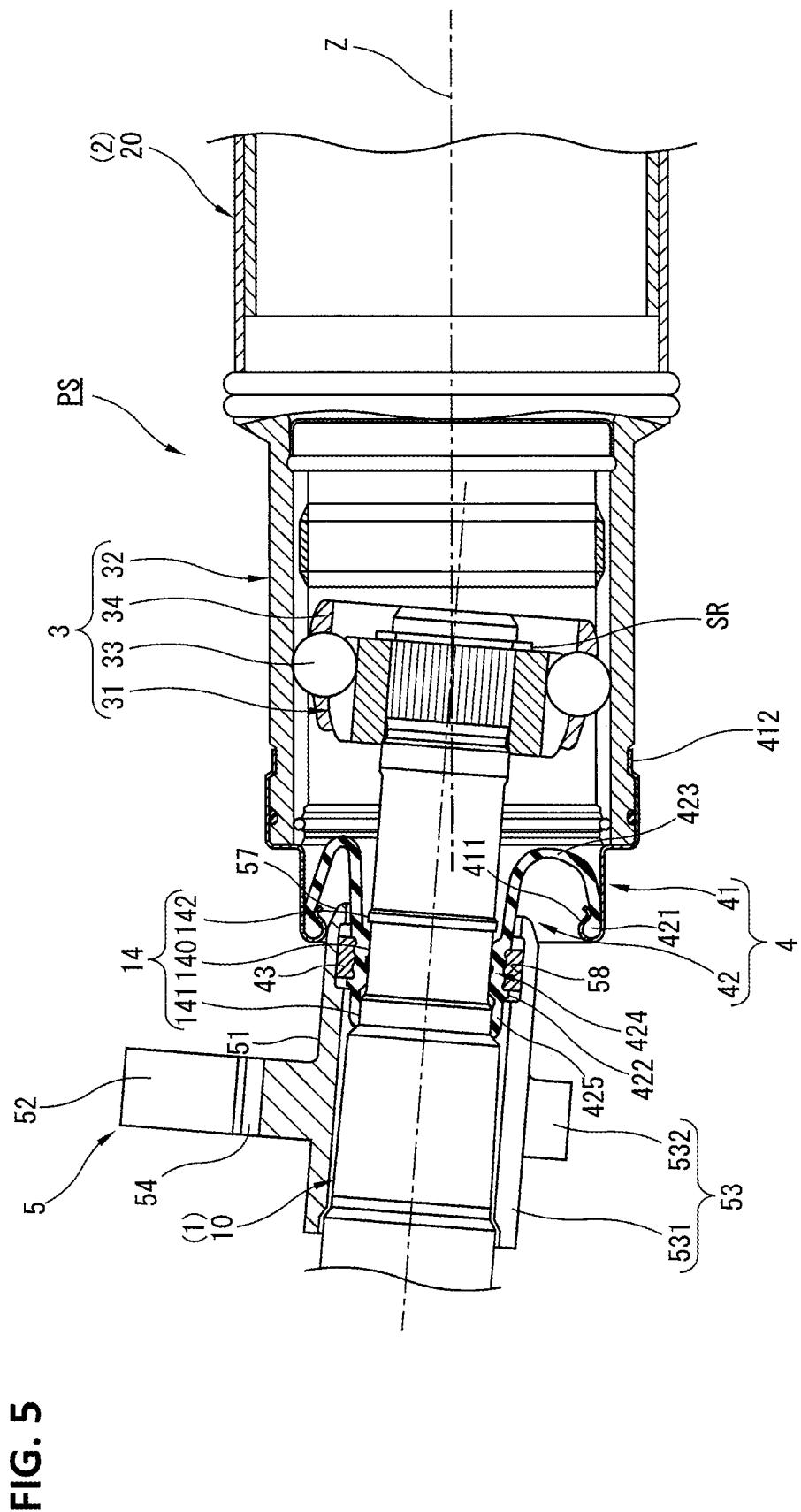
FIG. 5 is an enlarged sectional view of a main part of the propeller shaft for explaining working effects of the first embodiment in the present invention.

In this way, according to the present embodiment, the boot protection member 5 which is detachable to the first rotation member 1 is provided. With this, as shown, for example, in FIG. 5, when the angle variation of the constant velocity joint 3 is large, the insertion portion 57 of the boot protection member 5 is interposed between the first cover part 41 and the second cover part 42. Consequently, the interference of the first cover part 41 with the second cover part 42 is suppressed, thereby suppressing the damage of the second cover part 42.

In addition, in the present embodiment, the cut part 53 is formed in a taper shape of which the width dimension in the circumferential direction gradually increases toward the outside in the radial direction.

In this way, in the present embodiment, the cut part 53 is formed in a taper shape having a width widened toward the outside in the radial direction. Consequently, the manufacturing of a mold for molding the boot protection member 5 becomes easier, and the mold releasability at the time of the molding of the boot protection member 5 also becomes excellent.

Moreover, since the cut part 53 is formed in a taper shape, when the boot protection member 5 is mounted on the first rotation member 1, the taper-shaped cut part 53 can be easily opened along the outer surface of the first rotation member 1. Consequently, mounting work of the boot protective member 5 to the first rotation member 1 via the cut part 53 can be performed easier.

Second Embodiment

In FIGS. 6-11, there is shown a second embodiment of the propeller shaft PS and the boot protection member 5 of the propeller shaft according to the present invention, and a spacer member 6 is mainly added to the boot protection member 5 according to the first embodiment. In addition, since basic configurations except the changes are the same as the first embodiment, the same symbols are applied to the same components as the first embodiment, and redundant explanation is omitted.

(Configuration of Spacer Member)

Figure 6:
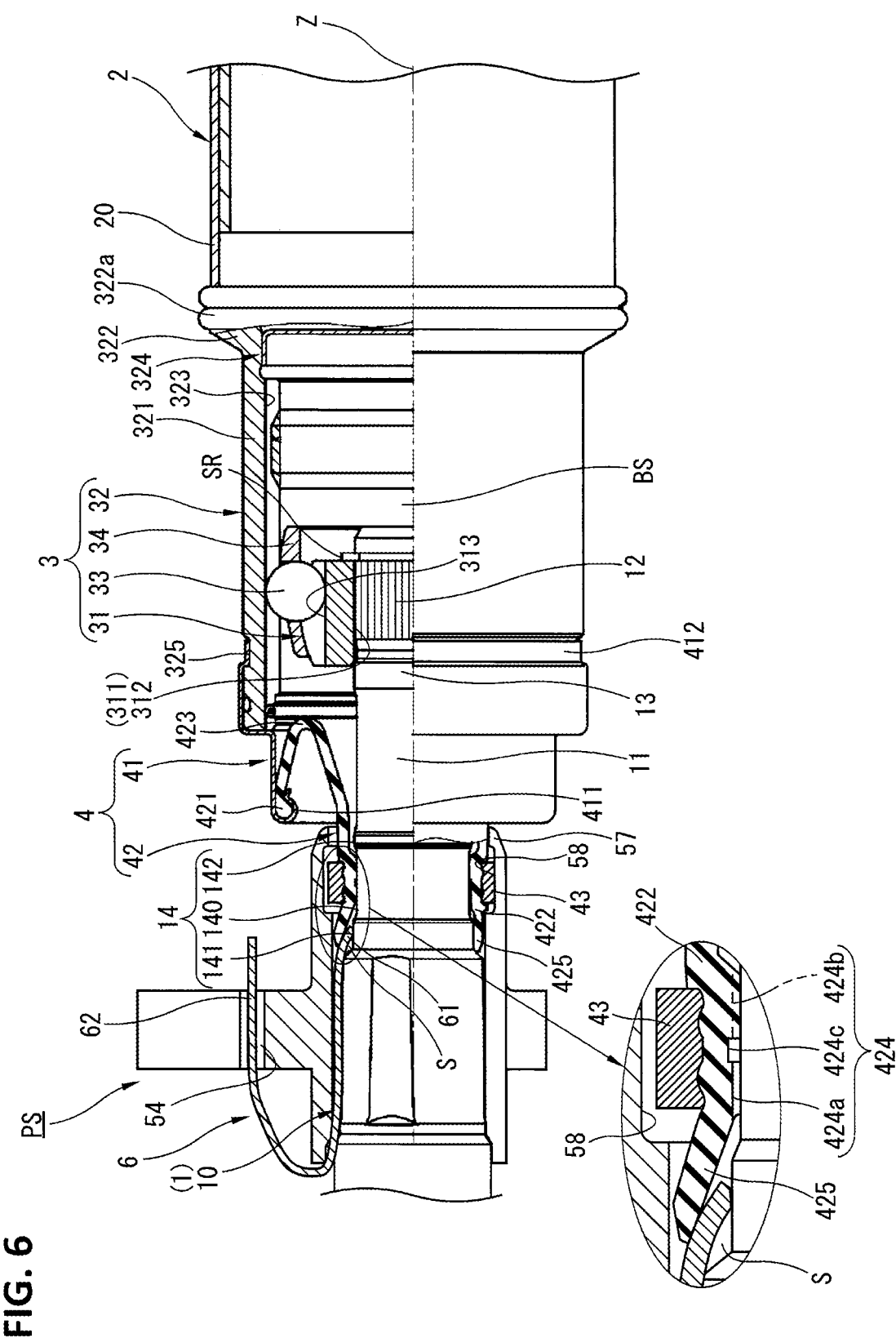
FIG. 6 is an enlarged sectional view of a main part of the propeller shaft according to a second embodiment of the present invention, and illustrates a state in which the boot protection member and a spacer member are mounted.
Figure 7:
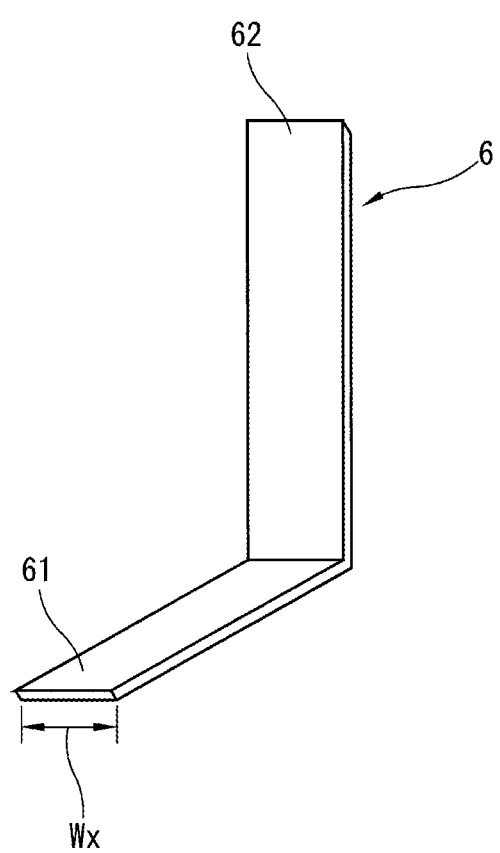
FIG. 7 is a perspective view of the spacer member shown in FIG. 6.

FIG. 6 shows a second embodiment of the propeller shaft PS and the boot protection member 5 of the propeller shaft according to the present invention, and is an enlarged sectional view of a main part of the propeller shaft PS shown in FIG. 3 in which a spacer member 6 is mounted via the boot protection member 5. In addition, FIG. 7 is a perspective view of the spacer member 6 shown in FIG. 6.

As shown, for example, in FIG. 6, in the propeller shaft PS according to the present embodiment, a spacer member 6 is provided which is capable of securing the discharge of the inner pressure of the boot member 4 through the ventilation groove 424 and the extending portion 425 of the boot member 4. The spacer member 6 is an extremely thin flat belt-shaped string member (for example, a PP band) which is made of relatively hard resin material such as plastic material. In addition, in the spacer member 6, a maximum dimension Wx of a circumferential width W in the longitudinal direction has a fixed width dimension larger than the circumferential width D of the opening portion OP of the boot protection member 5, and the middle part of the spacer member 6 is bent at a substantially right angle (L shape) in a free state.

Here, in addition to the above-mentioned relatively hard resin material, the spacer member 6 may be made of metal material (such as aluminum and stainless). In other words, it is sufficient that the spacer member 6 can be pushed into the inside of the extending portion 425 of the boot member 4 from the axial direction against the extending portion 425. In other words, it is sufficient to have rigidity higher than that of the extending portion 425, and the material is not limited to the materials shown above as an example.

Specifically, a longitudinal first end portion 61 of the spacer member 6 is inserted between the first enlarged diameter portion 141 of the first rotation member 1 and the extending portion 425 of the boot member 4 from the axial direction. With this, the longitudinal first end portion 61 of the spacer member 6 acts so as to lift a part in the circumferential direction of the extending portion 425, and a gap S is formed between the first enlarged diameter portion 141 of the first rotation member 1 and the extending portion 425 of the boot member 4. When the propeller shaft PS is mounted on a vehicle, at the time when the axial length of the propeller shaft PS is temporarily shorted via the constant velocity joint 3, the gap S allows to effectively discharge the inner pressure raised in the boot member 4 due to the shortening of the axial length of the propeller shaft PS, in cooperation with the ventilation groove 424.

On the other hand, a longitudinal second end portion 62 of the spacer member 6 faces the outside from the front end side while passing through the inner side of the cylindrical portion 51 of the boot protection member 5, and is bent so as to be folded back toward the axially opposite side (rear side), so as to be inserted into the slit portion 54 of the boot protection member 5. In addition, the spacer member 6 inserted into the slit portion 54 comes in contact with the upper surface of the slit portion 54 (lower end portions of the pair of the protrusion portions 55) with elastic force generated by the bending, and is held by friction force generated between the slit portion 54 and the spacer member 6 in the inside of the slit portion 54.

(Configuration of Boot Protection Member)

Figure 8A:
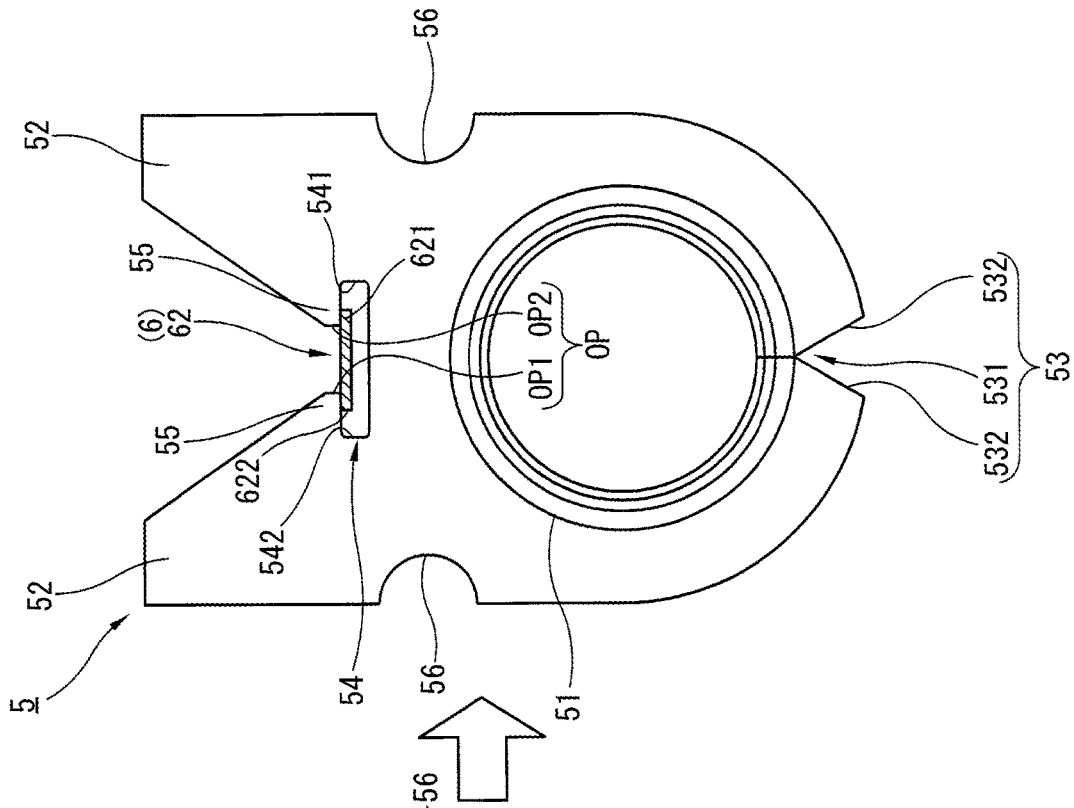
FIGS. 8A and 8B are sectional views showing the process of the insertion of the spacer member into the boot protection member.
Figure 8B:
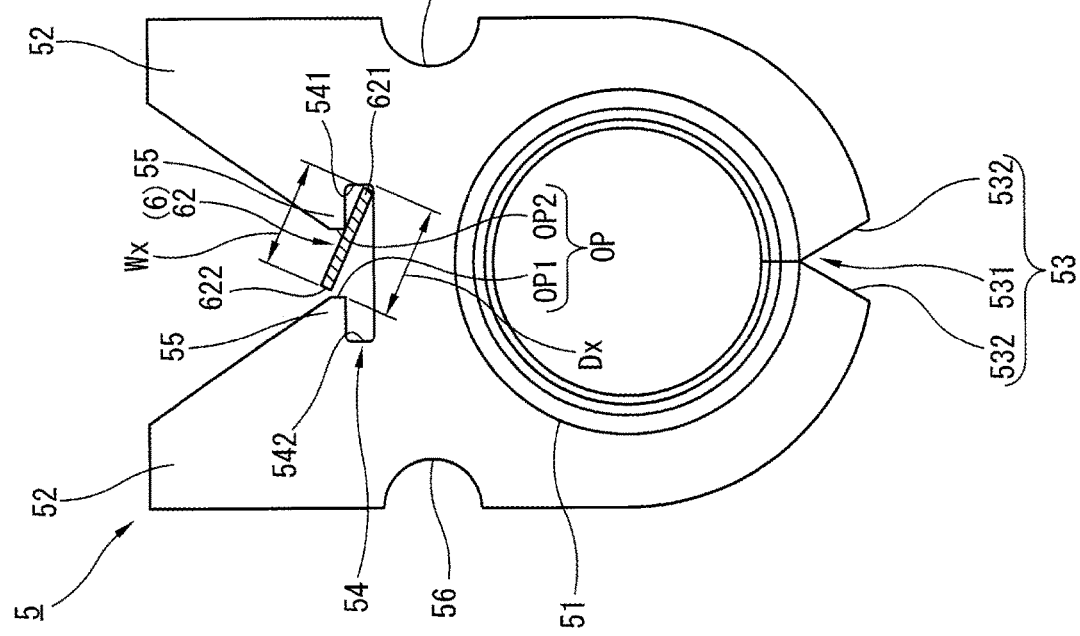

FIGS. 8A and 8B are sectional views showing the insertion process of the spacer member 6 into the boot protection member 5, and FIG. 8A illustrates a state of the spacer member 6 in the middle of the insertion and FIG. 8B illustrates a state of the spacer member 6 after the insertion. In addition, the configuration of the boot protection member 5 will be explained in detail by appropriately referring FIGS. 4A and 4B, in addition to FIGS. 8A and 8B.

As shown in FIG. 4A, in the slit portion 54, the circumferential width W that is a short-side width is set so as to be wider than a radial width H, so as to have a longitudinal shape extending in the circumferential direction. In addition, in the slit portion 54, the circumferential width W is set so as to be wider than the circumferential width D of the opening portion OP, so as to be widened stepwise with respect to the opening portion OP. Here, the slit portion 54 is formed such that, in the axial view (see FIG. 4A), a maximum distance Dx between a circumferential first end portion OP1 of the opening portion OP and a circumferential first end portion 541 of the slit portion 54 which is the end portion on the side far from the circumferential first end portion OP1 of the opening portion OP is larger than the maximum dimension Wx of the circumferential width W of the spacer member 6. Consequently, the spacer member 6 can be inserted into the slit portion 54 from the axial direction, and in addition to this, as shown in FIG. 8A, it can be inserted into the slit portion 54 from the radial direction via the opening portion OP.

Specifically, as shown in FIG. 8A, the longitudinal second end portion 62 of the spacer member 6 is obliquely inserted into the opening portion OP from the circumferential first end portion 621 side, and the circumferential first end portion 621 is inserted until coming in contact with the circumferential first end portion 541 of the slit portion 54. After that, while the contact state of the circumferential first end portion 621 is held, a circumferential second end portion 622 of the spacer member 6 is turned downward with the contact point of the circumferential first end portion 621 as a fulcrum, and, as shown in FIG. 8B, the circumferential second end portion 622 is also accommodated in the slit portion 54. With this, the entire longitudinal second end portion 62 of the spacer member 6 is accommodated in the slit portion 54.

(Mounting Process of Spacer Member and Boot Protection Member)

FIGS. 9A-9D are enlarged perspective views of a main part of the propeller shaft PS, and there is shown the process of the mounting of the boot protection member 5 and the spacer member 6 to the propeller shaft PS according to the present embodiment, and FIG. 9A illustrates the process of the insertion of the longitudinal first end portion 61 of the spacer member 6 into the space between the extending portion 425 of the boot member 4 and the shaft portion 10 (first enlarged diameter portion 141) of the first rotation member 1, FIG. 9B illustrates the process of the mounting of the boot protection member 5 to the propeller shaft PS in a state immediately before the mounting of the boot protection member 5, FIG. 9C illustrates the process of the mounting of the boot protection member 5 to the propeller shaft PS in a state immediately after the mounting of the boot protection member 5, and FIG. 9D illustrates the process of the insertion of the longitudinal second end portion 62 of the spacer member 6 into the slit portion 54 of the boot protection member 5.

First, as shown in FIG. 9A, the longitudinal first end portion 61 of the spacer member 6 which has been bent in a L shape is inserted between the first enlarged diameter portion 141 of the first rotation member 1 and the extending portion 425 of the boot member 4 from the axial direction, so as to be along the shaft portion 10. With this, by the inserted longitudinal first end portion 61 of the spacer member 6, the gap S (see FIG. 6) is formed between the first enlarged diameter portion 141 of the first rotation member 1 and the extending portion 425 of the boot member 4.

After that, as shown in FIG. 9B, in a predetermined axial region extending over the longitudinal first end portion 61 of the spacer member 6 and the second cover part 42 of the boot member 4, by pinching the pair of the projection portions 52 of the boot protection member 5, the cut part 53 is opened vertically downward. Here, the predetermined axial region is an axial position at which the recess portion 58 of the boot protection member 5 is superimposed on the boot band 43 (see FIG. 6).

Then, as shown in FIG. 9C, the cylindrical portion 51 is fitted at the axial region extending over the longitudinal first end portion 61 of the spacer member 6 and the second cover part 42 of the boot member 4 via the opened cut part 53. Specifically, in a state in which the cut part 53 is pushed to the outer circumferential surface in the axial region of the propeller shaft PS, the cylindrical portion 51 is pushed into the axial region. That is, the cylindrical portion 51 is pushed thereinto from the upper side, the cylindrical portion 51 is fitted to the axial region while the cut part 53 is expanded along the taper shape of the cut part 53.

After the boot protection member 5 is mounted on the propeller shat PS, as shown in FIG. 9D, the longitudinal second end portion 62 of the spacer member 6 is inserted into the slit portion 54 via the opening portion OP. Specifically, as shown in FIGS. 8A and 8B, the circumferential first end portion 621 of the longitudinal second end portion 62 of the spacer member 6 is obliquely inserted from the upper side of the opening portion OP (see FIG. 8A), and, in a state in which the circumferential first end portion 621 comes in contact with the circumferential first end portion 541 of the slit portion 54, the circumferential second end portion 622 of the spacer member 6 is turned downward with the contact point of the circumferential first end portion 621 as a fulcrum (see FIG. 8B). With this, the entire longitudinal second end portion 62 of the spacer member 6 is accommodated in the slit portion 54. Accordingly, a packing style of the propeller shaft PS at the time of delivery is completed.

(Removing Process of Spacer Member and Boot Protection Member)

Figure 10A:
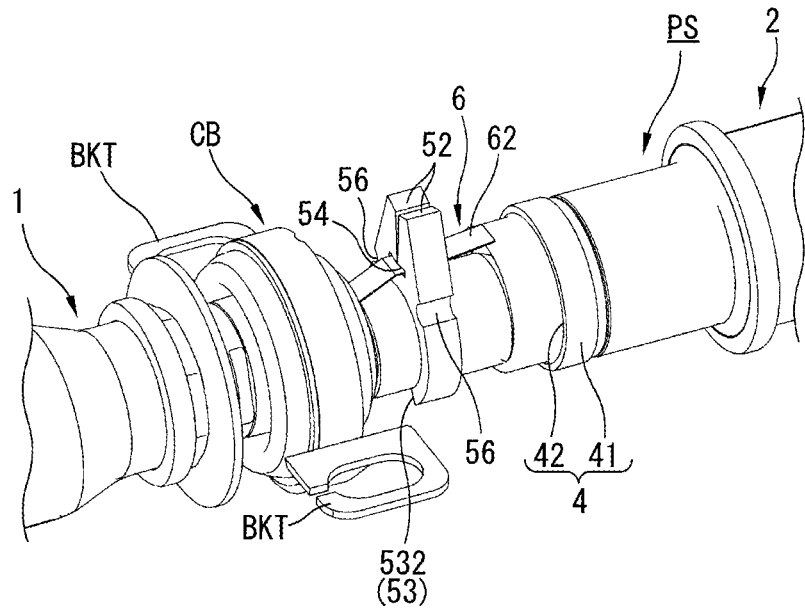
FIGS. 10A and 10B are enlarged perspective views of a main part of the propeller shaft which show the process of the removing of the boot protection member from the propeller shaft in the second embodiment of the present invention.
Figure 10B:
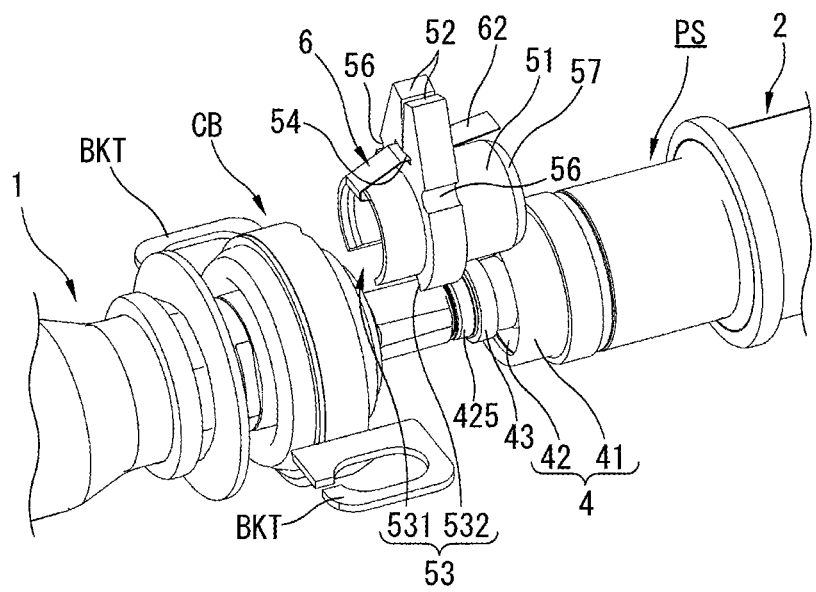

FIGS. 10A and 10B are enlarged perspective views of a main part of the propeller shafts PS, and there is shown the process of the removing of the boot protection member 5 from the propeller shaft PS according to the present embodiment, and FIG. 10A illustrates a state before the removing of the boot protection member 5, and FIG. 10B illustrates a state after the removing of the boot protection member 5. In addition, FIG. 11 is a sectional view showing a holding state of the spacer member 6 in the boot protection member 5 at the time when the boot protection member 5 and the spacer member 6 separate from the propeller shaft PS.

First, as shown in FIG. 10A, by pinching the pair of the projection portions 52 of the boot protection member 5, the cut part 53 is opened vertically downward. Next, by lifting the pair of the projection portions 25 vertically upward while pinching the pair of the projection portions 25, as shown in FIG. 10B, the cut part 53 is expanded along the outer surface of the shaft portion 10, and the boot protection member 5 separates from the propeller shaft PS.

Figure 11:
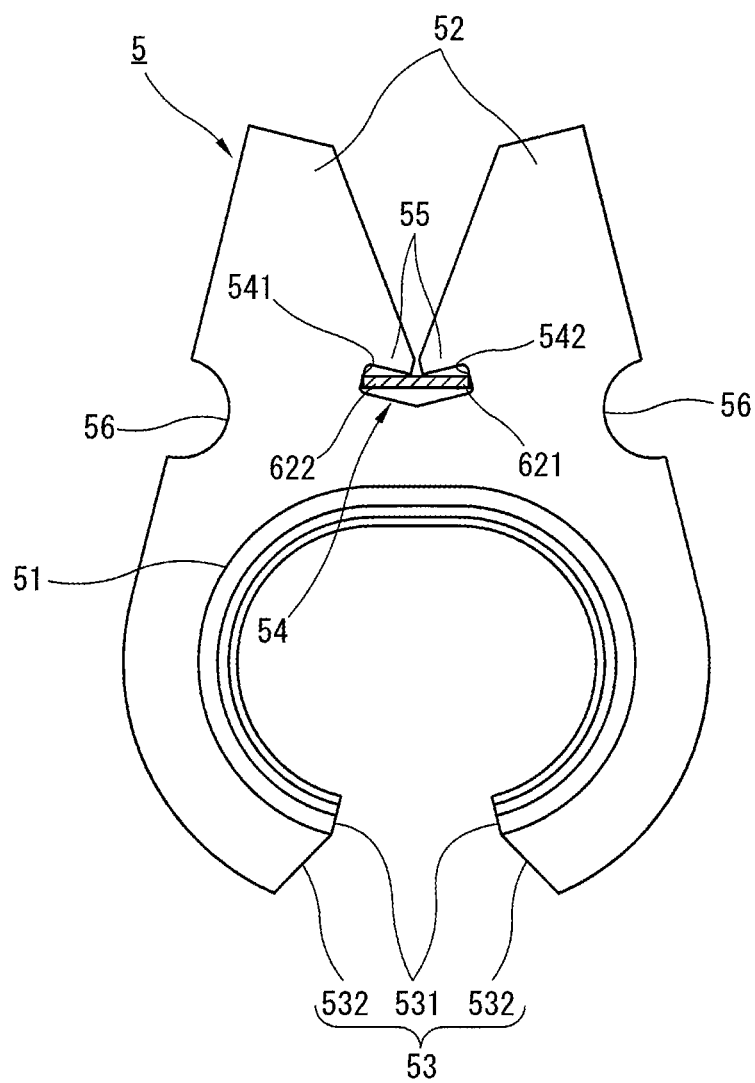
FIG. 11 is a sectional view showing a holding state of the spacer member in the boot protection member at the time when the boot protection member and the spacer member separate from the propeller shaft.

Here, at the time of the separation of the boot protection member 5, since the pair of the projection portion 52 are pinched, as shown in FIG. 11, the pair of the protrusion portions 55 are each turned downward, the both protrusion portions 55 approach and come in contact with each other, and then the opening portion OP is closed. In addition, by the approaching of the pair of the protrusion portions 55, the both circumferential end portions 541 and 542 of the slit portion 54 approach each other, and the both circumferential end portions 621 and 622 of the spacer member 6 are sandwiched between the both circumferential end portions 541 and 542 of the slit portion 54. Moreover, the pair of the protrusion portions 55 are turned downward, and by the both protrusion portions 55, the spacer member 6 is pushed toward the bottom side of the slit portion 54.

In this way, a plurality of actions organically link together, and the longitudinal second end portion 62 side of the spacer member 6 is held by the boot protection member 5, thereby suppressing the falling off of the longitudinal second end portion 62 of the spacer member 6 from the slit portion 54. Consequently, the spacer member 6 separates from the propeller shaft PS together with the boot protection member 5 by following the boot protection member 5 (see FIG. 10B).

Working Effects of Present Embodiment

The propeller shaft PS according to the present embodiment is provided with a spacer member 6 which is inserted between the first rotation member 1 (first enlarged diameter portion 141) and the boot member 4 (extending portion 425), and the longitudinal first end portion 61 of the spacer member 6 is inserted between the first rotation member 1 (first enlarged diameter portion 141) and the boot member 4 (extending portion 425) through the inner side of the cylindrical portion 51, and the longitudinal second end portion 62 of the spacer member 6 is folded back at the end portion on the opposite side of the second rotation member 2 of the cylindrical shaft 51 so as to be inserted into the slit portion 54.

In this way, in the present embodiment, the longitudinal first end portion 61 of the spacer member 6 is inserted between the first enlarged diameter portion 141 of the first rotation member 1 and the extending portion 425 of the boot member 4. That is, the extending portion 425 of the boot member 4 is lifted by the insertion of the spacer member 6, and the gap S is formed between the first enlarged diameter portion 141 of the first rotation member 1 and the extending portion 425 of the boot member 4, and by the gap S, ventilation property is improved, as a result of which the inner pressure of the boot member 4 which is discharged from the ventilation groove 424 can be efficiently discharged. With this, the relative movement between the first rotation member 1 and the second rotation member 2 is facilitated, and, at the time of the mounting of the propeller shaft PS to a vehicle, it is possible to contract the propeller shaft PS in the axial direction easier, thereby improving mounting workability of the propeller shaft PS to a vehicle.

On the other hand, the longitudinal second end portion 62 side of the spacer member 6 is folded back so as to be inserted into the slit portion 54. With this, the longitudinal second end portion 62 side of the spacer member 6 is held at the slit portion 54, thereby suppressing unintentional falling-off of the spacer member 6.

In addition, in the present embodiment, the spacer member 6 is a belt-shaped string member.

In this way, in the present embodiment, the spacer member 6 is formed by a belt-shaped string member. With this, the spacer member 6 can be formed so as to have a thin thickness. Consequently, the excessive deformation of the extending portion 425 of the boot member 4 into which the spacer member 6 is inserted can be suppressed.

In addition, in the present embodiment, the spacer member 6 is made of plastic material or metal material.

In this way, in the present embodiment, since the spacer member 6 is made of plastic material or metal material, a certain rigidity can be secured to the spacer member 6, and thereby insertion work of the spacer member 6 to the extending portion 425 of the boot member 4 can be easily carried out.

Moreover, since the spacer member 6 is made of a relatively hard material such as plastic material and metal material, in the slit portion 54, the longitudinal second end portion 62 comes in elastic contact with the upper surface of the slit portion 54 with the reaction force generated by the bending. With this, the longitudinal second end portion 62 of the spacer member 6 is held at the slit portion 54 by the friction force generated between the spacer member 6 and the slit portion 54. Consequently, the holding property of the spacer member 6 in the slit portion 54 is improved, and thereby the falling-off of the longitudinal second end portion 62 of the spacer member 6 from the slit portion 54 can be effectively suppressed.

In addition, in the present embodiment, when viewed in the axial direction, the slit portion 54 is formed in a rectangular shape of which a length in the circumferential direction is longer than a length in the radial direction.

In this way, in the present embodiment, the circumferential width W is wider than the radial width H of the slit portion 54. With this, the movement of the spacer member 6 inside the slit portion 54 can be suppressed. Consequently, unexpected falling-off of the spacer member 6 can be suppressed.

In addition, in the present embodiment, the slit portion 54 includes an opening portion OP opened in the radial direction.

In this way, in the present embodiment, in the slit portion 54, the opening portion OP opened in the radial direction is provided. With this, while the longitudinal second end portion 62 side of the spacer member 6 is folded back relatively large, the spacer member 6 can be inserted into the slit portion 54 via the opening portion OP. Consequently, the insertion work of the spacer member 6 into the slit portion 54 can be easily carried out.

In particular, in the present embodiment, the slit portion 54 is set to a necessary minimum size for regulating the degree of freedom of the spacer member 6. On the other hand, the spacer member 6 is formed to be a relatively hard for securing a certain rigidity. Consequently, as compared with case where the slit portion 54 is inserted from the axial direction while the longitudinal second end portion 62 side of the spacer member 6 is folded back relatively small, the insertion work of the spacer member 6 can be largely enhanced.

In addition, in the present embodiment, in the cross section viewed in the axial direction, the maximum width dimension (maximum dimension Wx of the circumferential width W) of the spacer member 6 is set so as to be larger than the width dimension (circumferential width D) of the opening portion OP.

In this way, in the present embodiment, the maximum dimension Wx of the circumferential width W of the spacer member 6 is set so as to be larger than the circumferential width D of the opening portion OP. With this, after the spacer member 6 is inserted into the slit portion 54, the falling-off of the spacer member 6 from the slit portion 54 through the opening portion OP can be suppressed. Consequently, the holding property of the spacer member 6 inside the slit portion 54 is enhanced, and thereby, in the boot protection member 5, the spacer member 6 can be stably accommodated and held.

In addition, in the present embodiment, the slit portion 54 is widened stepwise with respect to the opening portion OP, and, in the cross section viewed in the axial direction, a maximum distance Dx between a circumferential one end portion (circumferential first end portion OP1) of the opening portion OP and a circumferential end portion (circumferential first end portion 541) of the slit portion 54 which is positioned on the side far from the circumferential one end portion (circumferential first end portion OP1) of the opening portion OP is larger than the maximum dimension Wx in the circumferential direction of the spacer member 6.

In this way, in the present embodiment, the maximum dimension Wx of the circumferential width W of the spacer member 6 is set so as to be larger than the circumferential width D of the opening portion OP. In addition, the maximum distance Dx between the circumferential first end portion OP1 of the opening portion OP and the circumferential first end portion 541 of the slit portion 54 which is the end portion on the side far from the circumferential first end portion OP1 is larger than the maximum dimension Wx of the circumferential width W of the spacer member 6. Consequently, the falling-off of the spacer member 6 through the opening portion OP can be effectively suppressed, and the spacer member 6 can be easily inserted into the slit portion 54 though the opening portion OP without bending the spacer member 6 in the circumferential direction (width direction). Specifically, by the dimensional relationship mentioned above, in a state in which the circumferential first end portion 621 of the spacer member 6 comes in contact with the circumferential first end portion 541 of the slit portion 54 which is positioned on the side far from the circumferential first end portion OP1 of the opening portion OP, the circumferential second end portion 622 of the spacer member 6 is turned downward, and thereby the spacer member 6 can be easily inserted into the slit portion 54 through the opening portion OP without the interference of the circumferential second end portion 622 of the spacer member 6 with the circumferential first end portion OP1 of the opening portion OP.

(Variation)

Figure 12:
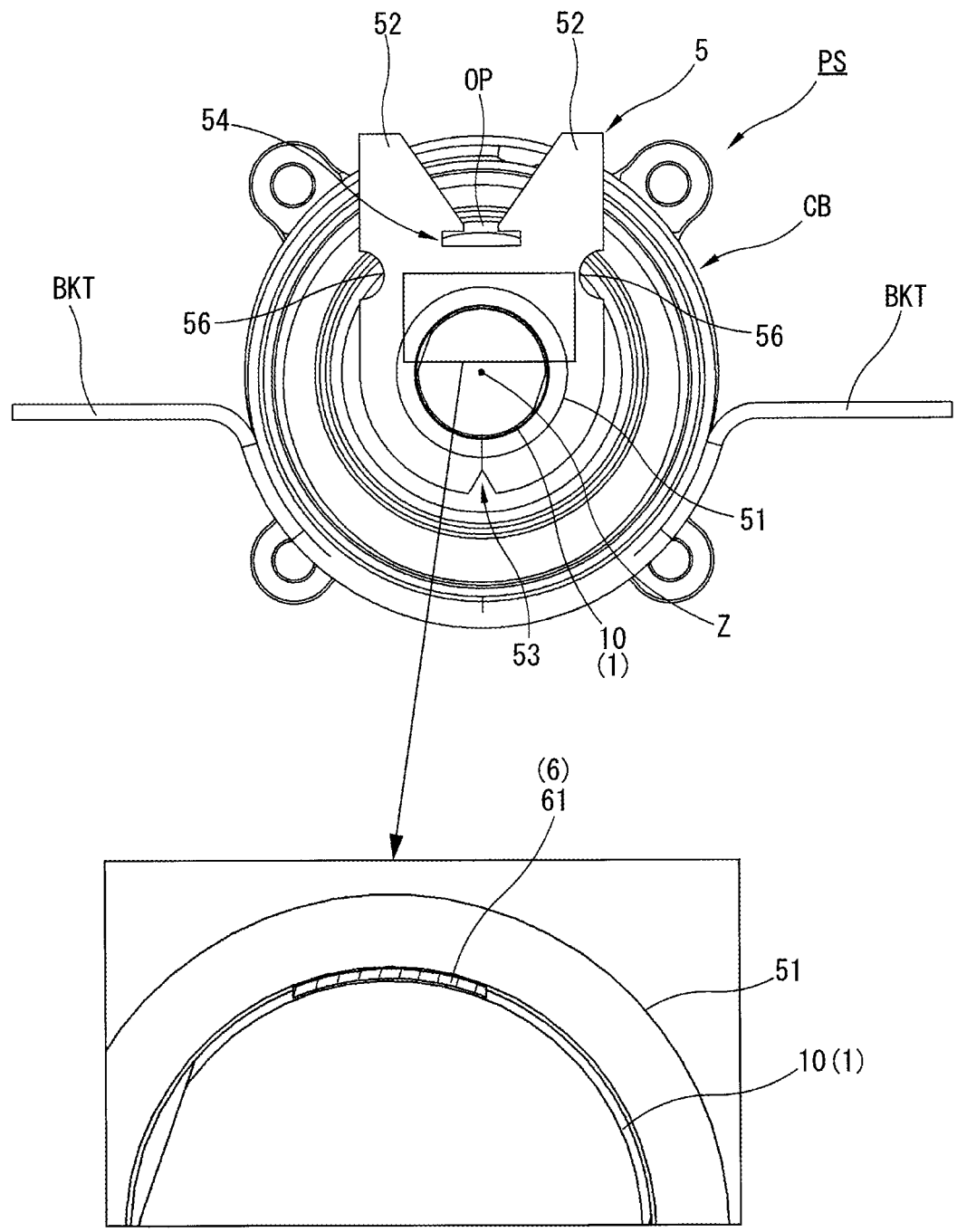
FIG. 12 is a radial sectional view of the propeller shaft according to a variation of the second embodiment of the present invention.

FIG. 12 illustrates a variation of the second embodiment of the propeller shaft PS and the boot protection member 5 of the propeller shaft according to the present invention, and the sectional shape of the spacer member 6 according to the second embodiment is mainly changed. In addition, since base configurations other than the changes are the same as the second embodiment, the same symbols are applied to the same components as the second embodiment, and redundant explanation is omitted.

That is, in the propeller shaft PS according to the present variation, as shown in FIG. 12, the longitudinal first end portion 61 side of the spacer member 6 which is inserted into the inner side of the extending portion 425 of the boot member 4 is curved in the circumferential direction along the outer peripheral surface of the shaft portion 10 such that the cross section orthogonal to the longitudinal direction has a substantially circular arc shape.

As the above, in the present variation, the cross section of the spacer member 6 has a circular arc shape.

According to the above configuration, the longitudinal first end portion 61 of the spacer member 6 can be easily inserted between the first enlarged diameter portion 141 of the first rotation member 1 and the extending portion 425 of the boot member 4, along the outer peripheral surface of the first rotation member 1 of which the cross section is a substantially circular shape.

In addition, by forming the spacer member 6 in a circular arc shape along the shaft portion 10 of the first rotation member 1 which has a cylindrical shape, as compared with case where the spacer member 6 is formed in a flat plate shape as shown in the second embodiment, the damage of the extending portion 425 of the boot member 4 caused by the insertion of the spacer member 6 can be suppressed.

The present invention is not limited to the modes and configurations shown in the embodiments, and if it has a mode which is capable of exhibiting the above-mentioned working effects of the present invention, it can be freely varied according to types and costs of a propeller shaft as an application object.

In addition, although, in the above embodiments, as an example, a mode has been explained in which the inner ring member 31 is arranged on the driving side that is the front end side and the outer ring member 32 is arranged on the driven side that is the rear end side, the opposite configuration may be applied. In other words, a mode can be applied in which the outer ring member 32 is arranged on the driving side that is the front end side and the inner ring member 31 is arranged on the driven side that is the rear end side. In addition, the rolling elements of the constant velocity joint 3 are not limited to ball members.

EXPLANATION OF REFERENCE NUMERALS

1: First rotation member, 10: Shaft member, 2: Second rotation member, 3: Constant velocity joint, 31: Inner ring member, 32: Outer ring member, 33: Ball member, 4: Boot member, 41: First cover part, 42: Second cover part, 5: Boot protection member, 51: Cylindrical portion, 52: Projection portion, 53: Cut part, 54: Slit portion, 6: Spacer member, OP: Opening portion, PS: Propeller shaft, Z: rotation axial line.

The invention claimed is:

1. A boot protection member of a propeller shaft which is configured to protect a boot member used for the propeller shaft in which a first rotation member and a second rotation member are connected to each other via a constant velocity joint, and is detachable to the first rotation member, wherein the constant velocity joint includes: an inner ring member connected to the first rotation member; and an outer ring member which is connected to the second rotation member and to which a rotation of the second ring member is transmitted via a rolling element disposed on an outer peripheral side of the inner ring member, and wherein the boot member includes: a first cover part having a first end portion extending in a direction approaching the first rotation member in an axial direction along a rotation axial line of the first rotation member and a second end portion fixed to an outer peripheral side of the outer ring member; and a second cover part having a first end portion disposed on an inner peripheral side of the outer ring member while being folded back from the first cover part and a second end portion fixed to the first rotation member, the boot protection member comprising:
- a cylindrical portion surrounding an outer periphery of the first rotation member;
- an insertion portion which is inserted between the first cover part and the second cover part in the cylindrical portion;
- a plurality of projection portions projecting to an outer peripheral side of the cylindrical portion in a radial direction orthogonal to the rotation axial line;
- a cut part provided on an opposite side of the plurality of the projection portions with the rotation axial line therebetween in the cylindrical portion;
- a slit portion which is provided between the plurality of the projection portions in a circumferential direction of the rotation axial line, and penetrates the boot protection member in the axial direction; and
- an opening portion provided between the plurality of projection portions, the slit portion communicating with an outside via the opening portion.

2. A propeller shaft used for an automobile, comprising:
a first rotation member;
a second rotation member to which a rotation of the first rotation member is transmitted;
a constant velocity joint which is provided between the first rotation member and the second rotation member in an axial direction along a rotation axial line of the first rotation member, and includes:
- an inner ring member connected to the first rotation member; and
- an outer ring member which is connected to the second rotation member and to which the rotation is transmitted via a rolling element disposed on an outer peripheral side of the inner ring member;

a boot member which is provided between the first rotation member and the outer ring member, and includes:
- a first cover part having a first end portion extending in a direction approaching the first rotation member in the axial direction and a second end portion fixed to an outer peripheral side of the outer ring member; and
- a second cover part having a first end portion disposed on an inner peripheral side of the outer ring member while being folded back from the first cover part in the axial direction and a second end portion fixed to the first rotation member; and a boot protection member which is configured to protect the boot member, is detachable to the first rotation member, and includes:
- a cylindrical portion surrounding an outer periphery of the first rotation member;
- an insertion portion which is inserted between the first cover part and the second cover part in the cylindrical portion;
- a plurality of projection portions projecting to an outer peripheral side of the cylindrical portion in a radial direction orthogonal to the rotation axial line;
- a cut part provided on an opposite side of the plurality of the projection portions with the rotation axial line therebetween in the cylindrical portion; and
- a slit portion which is provided between the plurality of the projection portions in a circumferential direction of the rotation axial line, and penetrates the boot protection member in the axial direction.

3. The propeller shaft according to claim 2, further comprising a spacer member which is inserted between the first rotation member and the boot member,
wherein a longitudinal first end portion of the spacer member is inserted between the first rotation member and the boot member through an inner side of the cylindrical portion, and
wherein a longitudinal second end portion of the spacer member is folded back at an end portion on an opposite side of the second rotation member of the cylindrical shaft so as to be inserted into the slit portion.

4. The propeller shaft according to claim 3, wherein the spacer member is a belt-shaped string member.

5. The propeller shaft according to claim 3, wherein the spacer member is made of a plastic material or a metal material.

6. The propeller shaft according to claim 3, wherein a cross section of the spacer member has a circular arc shape.

7. The propeller shaft according to claim 3, wherein when viewed in the axial direction, the slit portion is formed in a rectangular shape of which a length in the circumferential direction is longer than a length in the radial direction.

8. The propeller shaft according to claim 3, wherein the slit portion includes an opening portion opened in the radial direction.

9. The propeller shaft according to claim 8, wherein, in a cross section viewed in the axial direction, a maximum width dimension of the spacer member is set so as to be larger than a width dimension of the opening portion.

10. The propeller shaft according to claim 8, wherein the slit portion is widened stepwise with respect to the opening portion, and
wherein, in a cross section viewed in the axial direction, a maximum distance between a circumferential one end portion of the opening portion and a circumferential end portion of the slit portion which is positioned on a side far from the circumferential one end portion of the opening portion is larger than a dimension in the circumferential direction of the spacer member.

11. The propeller shaft according to claim 8, wherein notch portions are formed at respective root portions of the plurality of the projection portions.

12. The propeller shaft according to claim 3, wherein the cut part is formed in a taper shape of which a width dimension in the circumferential direction gradually increases toward an outside in the radial direction.

* * * * *